US012259505B2

(12) United States Patent
Kauppinen et al.

(10) Patent No.: US 12,259,505 B2
(45) Date of Patent: Mar. 25, 2025

(54) DETECTOR PIXEL FLOATING

(71) Applicant: Detection Technology Oyj, Oulu (FI)

(72) Inventors: Matti Kauppinen, Oulu (FI); Mikko Matikkala, Oulu (FI)

(73) Assignee: DETECTION TECHNOLOGY OYJ, Oulu (FI)

( * ) Notice: Subject to any disclaimer, the term of this patent is extended or adjusted under 35 U.S.C. 154(b) by 219 days.

(21) Appl. No.: 18/044,199

(22) PCT Filed: Sep. 29, 2021

(86) PCT No.: PCT/FI2021/050646
§ 371 (c)(1),
(2) Date: Mar. 6, 2023

(87) PCT Pub. No.: WO2022/069803
PCT Pub. Date: Apr. 7, 2022

(65) Prior Publication Data
US 2023/0324569 A1 Oct. 12, 2023

(30) Foreign Application Priority Data

Sep. 30, 2020 (EP) .................................... 20199279

(51) Int. Cl.
*G01T 1/24* (2006.01)
*G01T 1/29* (2006.01)

(52) U.S. Cl.
CPC .............. *G01T 1/247* (2013.01); *G01T 1/241* (2013.01); *G01T 1/2928* (2013.01)

(58) Field of Classification Search
CPC ........ G01T 1/247; G01T 1/241; G01T 1/2928
See application file for complete search history.

(56) References Cited

U.S. PATENT DOCUMENTS

2005/0285043 A1\* 12/2005 Nascetti ................... H04N 5/32
250/370.09
2019/0250284 A1\* 8/2019 Naito ........................ G01T 1/17

FOREIGN PATENT DOCUMENTS

JP 5001649 B2 8/2012
WO 2018087975 A1 5/2018

OTHER PUBLICATIONS

European Patent Office, Extended European Search Report Issued in Application No. 20199279.9, Mar. 2, 2021, Germany, 50 pages.
(Continued)

*Primary Examiner* — Hugh Maupin
(74) *Attorney, Agent, or Firm* — McCoy Russell LLP

(57) ABSTRACT

It is an object to provide a device and a method for x-ray and/or gamma ray detection. a detector comprising a plurality of pixels, each pixel in the plurality of pixels being switchable between a floating mode and a detection mode, wherein each pixel in the plurality of pixels is configured to detect incident x-ray and/or gamma ray radiation when in the detection mode; a control unit coupled to the detector, configured to: during a first temporal frame, configure a first subset of pixels in the plurality of pixels to the floating mode and a second subset of pixels in the plurality of pixels to the detection mode; and during a second temporal frame, configure a third subset of pixels in the plurality of pixels to the floating mode and a fourth subset of pixels in the plurality of pixels to the detection mode.

14 Claims, 4 Drawing Sheets

(56) References Cited

OTHER PUBLICATIONS

ISA European Patent Office, International Search Report Issued in Application No. PCT/FI2021/050646, Dec. 23, 2021, WIPO, 2 pages.
International Bureau of WIPO, International Preliminary Report on Patentability Issued in Application No. PCT/FI2021/050646, Aug. 31, 2022, WIPO, 6 pages.

* cited by examiner

DETECTOR PIXEL FLOATING

CROSS REFERENCE TO RELATED APPLICATIONS

The present application is a U.S. National Phase of International Application No. PCT/FI2021/050646 entitled "DETECTOR PIXEL FLOATING," and filed on Sep. 29, 2021. International Application No. PCT/FI2021/050646 claims priority to European Patent Application No. 20199279.9 filed on Sep. 30, 2020. The entire contents of each of the above-listed applications are hereby incorporated by reference for all purposes.

TECHNICAL FIELD

The present disclosure relates to the field x-ray and gamma ray detectors, and more particularly to a device and a method for x-ray and/or gamma ray detection.

BACKGROUND

In pixelated x-ray and gamma ray detectors, if the width of the charge cloud created by incident radiation becomes comparable to the size of the pixels, a significant number of events may be shared between pixels. This may be referred to as charge sharing. Charge sharing can lead to a degradation of the spectroscopic performance of the detector by introducing a background of low-energy events.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an object to provide a device and a method for x-ray and/or gamma ray detection. The foregoing and other objects are achieved by the features of the independent claims. Further implementation forms are apparent from the dependent claims, the description and the figures.

According to a first aspect, a device comprises: a detector comprising a plurality of pixels, each pixel in the plurality of pixels being switchable between a floating mode and a detection mode, wherein each pixel in the plurality of pixels is configured to detect incident x-ray and/or gamma ray radiation when in the detection mode; a control unit coupled to the detector, configured to: during a first temporal frame, configure a first subset of pixels in the plurality of pixels to the floating mode and a second subset of pixels in the plurality of pixels to the detection mode; and during a second temporal frame, configure a third subset of pixels in the plurality of pixels to the floating mode and a fourth subset of pixels in the plurality of pixels to the detection mode. The device may, for example, reduce charge sharing in the detector and therefore improve the spectral resolution of the detector.

In an implementation form of the first aspect, the first subset of pixels corresponds to the fourth subset of pixels and/or the second subset of pixels corresponds to the third subset of pixels. The device may, for example, use the second subset of pixels for detection during the first temporal frame and use the first subset of pixels for detection during the second temporal frame. Thus, the full spatial resolution of the detector can be utilised.

In a further implementation form of the first aspect, pixels in the first subset of pixels are spatially non-adjacent, pixels in the second subset of pixels are spatially non-adjacent, pixels in the third subset of pixels are spatially non-adjacent, and/or pixels in the fourth subset of pixels are spatially non-adjacent. The device may, for example, further reduce charge sharing, since non-adjacent pixels are used for detection.

In a further implementation form of the first aspect, the first subset of pixels, the second subset of pixels, the third subset of pixels, and/or the fourth subset of pixels forms a chessboard pattern. The device may, for example, further reduce charge sharing, since non-adjacent pixels are used for detection in the chessboard pattern.

In a further implementation form of the first aspect, the control unit is further configured to: during the first temporal frame, obtain a detection count signal from each pixel in the second subset of pixels; and during the second temporal frame, obtain a detection count signal from each pixel in the fourth subset of pixels. The device may, for example, utilise detection counts from both temporal frames for improved accuracy.

In a further implementation form of the first aspect, the control unit is further configured to: during the first temporal frame and/or the second temporal frame, identify a detection in each of at least two pixels in the detection mode, wherein the at least two pixels are adjacent two a pixel in the floating mode; and count the detections from the at least two pixels for the floating pixel. The device may, for example, mitigate errors due to a hit occurring in the vicinity of a floating pixel.

In a further implementation form of the first aspect, the control unit is further configured to: combine the detection count signals from the first temporal frame and the second temporal frame. The device may, for example, utilise detection counts from both temporal frames by combining the hit counts from both temporal frames.

In a further implementation form of the first aspect, the detector comprises a conversion layer configured to convert the incident x-ray or gamma ray radiation into electric charge and a plurality of electrodes, corresponding to the plurality of pixels, configured to collect the electric charge when in the detection mode. The device may, for example, efficiently detect the incident radiation.

In a further implementation form of the first aspect, the conversion layer comprises cadmium telluride and/or cadmium zinc telluride. The device may, for example, efficiently convert the incident radiation into the electric charge.

In a further implementation form of the first aspect, the conversion layer is non-pixelated. The device may, for example, further mitigate charge sharing, since charge sharing may be more characteristic in detectors with non-pixelated conversion layers.

According to a second aspect, a method for controlling a detector comprising a plurality of pixels, each pixel in the plurality of pixels being switchable between a floating mode and a detection mode, wherein each pixel in the plurality of pixels is configured to detect incident x-ray or gamma ray radiation when in the detection mode comprises: during a first temporal frame, configuring a first subset of pixels in the plurality of pixels to the floating mode and a second subset of pixels in the plurality of pixels to the detection mode; and, during a second temporal frame, configuring a third subset of pixels in the plurality of pixels to the floating mode and a fourth subset of pixels in the plurality of pixels to the detection mode. The method may enable, for example, reducing charge sharing in the detector and therefore improving the spectral resolution of the detector.

In an implementation form of the second aspect, the first subset of pixels corresponds to the fourth subset of pixels and/or the second subset of pixels corresponds to the third subset of pixels. The method may enable, for example, using the second subset of pixels for detection during the first temporal frame and using the first subset of pixels for detection during the second temporal frame. Thus, the full spatial resolution of the detector can be utilised.

In a further implementation form of the second aspect, pixels in the first subset of pixels are spatially non-adjacent, pixels in the second subset of pixels are spatially non-adjacent, pixels in the third subset of pixels are spatially non-adjacent, and/or pixels in the fourth subset of pixels are spatially non-adjacent. The method may enable, for example, further reducing charge sharing, since non-adjacent pixels are used for detection.

In a further implementation form of the second aspect, the first subset of pixels, the second subset of pixels, the third subset of pixels, and/or the fourth subset of pixels forms a chessboard pattern. The method may enable, for example, further reducing charge sharing, since non-adjacent pixels are used for detection in the chessboard pattern.

In a further implementation form of the second aspect, the method further comprises: during the first temporal frame, obtaining a detection count signal from each pixel in the second subset of pixels; and during the second temporal frame, obtaining a detection count signal from each pixel in the fourth subset of pixels. The method may enable, for example, utilising detection counts from both temporal frames for improved accuracy.

In a further implementation form of the second aspect, the method further comprises: during the first temporal frame and/or the second temporal frame, identifying a detection in each of at least two pixels in the detection mode, wherein the at least two pixels are adjacent two a pixel in the floating mode; and counting the detections from the at least two pixels for the floating pixel. The method may enable, for example, mitigating errors due to a hit occurring in the area of a floating pixel.

In a further implementation form of the second aspect, the method further comprises: combining the detection count signals from the first temporal frame and the second temporal frame. The method may enable, for example, utilising detection counts from both temporal frames by combining the hit counts from both temporal frames.

According to a third aspect, a computer program product comprises program code configured to perform the method according to the second aspect when the computer program product is executed on a computer.

Many of the attendant features will be more readily appreciated as they become better understood by reference to the following detailed description considered in connection with the accompanying drawings.

DESCRIPTION OF THE DRAWINGS

In the following, example embodiments are described in more detail with reference to the attached figures and drawings, in which.

In the following, identical reference signs refer to similar or at least functionally equivalent features.

DETAILED DESCRIPTION

In the following description, reference is made to the accompanying drawings, which form part of the disclosure, and in which are shown, by way of illustration, specific aspects in which the present disclosure may be placed. It is understood that other aspects may be utilised, and structural or logical changes may be made without departing from the scope of the present disclosure. The following detailed description, therefore, is not to be taken in a limiting sense, as the scope of the present disclosure is defined be the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. On the other hand, for example, if a specific apparatus is described based on functional units, a corresponding method may include a step performing the described functionality, even if such step is not explicitly described or illustrated in the figures. Further, it is understood that the features of the various example aspects described herein may be combined with each other, unless specifically noted otherwise.

Figure 1:
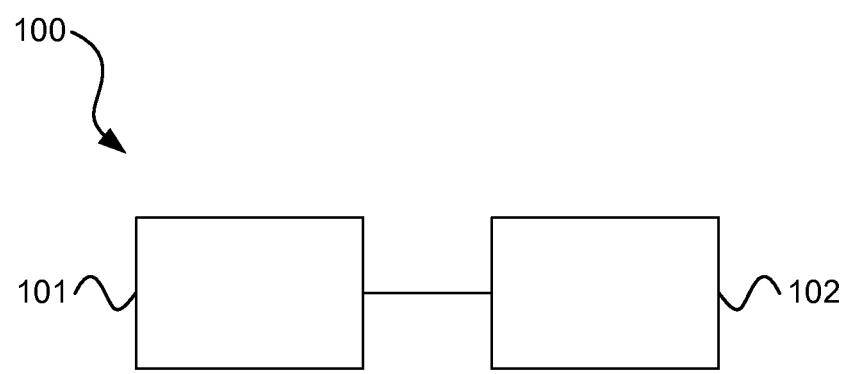
FIG. 1 illustrates a schematic representation of a device according to an embodiment.

FIG. 1 illustrates a schematic representation of a device 100 according to an embodiment.

According to an embodiment, the device 100 comprises a detector 101 comprising a plurality of pixels. Each pixel in the plurality of pixels may be switchable between a floating mode and a detection mode. Each pixel in the plurality of pixels may be configured to detect incident x-ray and/or gamma ray radiation when in the detection mode.

The plurality of pixels may be spatially arranged into, for example, a two-dimensional array or matrix.

A floating mode may refer to a mode of operation where the pixel is electrically disconnected from, for example, ground or other reference voltage. Thus, when in the floating mode, a pixel cannot detect the incident x-ray or and/or gamma ray radiation, because charge generated by the radiation in the detector cannot flow via the pixel. The floating mode may also be referred to as a disconnected mode, a disabled mode, or similar.

A detection mode may refer to a mode of operation where the pixel is electrically connected in such a fashion that the incident x-ray or and/or gamma ray radiation can be detected via the pixel. The detection mode may also be referred to as a connected mode, enable mode, or similar.

Each pixel in the plurality of pixels may be, for example, configured to detect the incident x-ray and/or gamma ray radiation in the vicinity of the pixel when in the detection mode.

Each pixel in the plurality of pixels may be further configured to detect an energy of the incident x-ray and/or gamma ray radiation when in the detection mode. Each pixel in the plurality of pixels may be, for example, further configured to detect the energy of the incident x-ray and/or gamma ray radiation in the vicinity of the pixel when in the detection mode.

The device 100 may further comprise a control unit 102 coupled to the detector 101, configured to, during a first temporal frame, configure a first subset of pixels in the plurality of pixels to the floating mode and a second subset of pixels in the plurality of pixels to the detection mode.

The control unit 102 may also be referred to as a processing unit, a computing unit, or similar.

The control unit 102 may be, for example, electrically coupled to each pixel in the plurality of pixels. In some embodiments, the control unit 102 may be implemented as an application-specific integrated circuit (ASIC). In some further embodiments, the ASIC may be integrated with the detector 101 into a single unit. In other embodiments, the control unit 102 may be embodied in a separate device from the detector 101.

A temporal frame may refer to a period of time of a preconfigured length. The temporal length of a temporal frame may vary depending on the application. The length of the temporal frames may be configured to be sufficient long for events enabling the detection of the incident radiation to occur in the detector 101.

The control unit 102 may be further configured to, during a second temporal frame, configure a third subset of pixels in the plurality of pixels to the floating mode and a fourth subset of pixels in the plurality of pixels to the detection mode.

According to an embodiment, the first subset of pixels corresponds to the fourth subset of pixels and/or the second subset of pixels corresponds to the third subset of pixels. Thus, the first subset of pixels may be configured to the floating mode during the first temporal frame and to the detection mode during the second temporal frame. Correspondingly, the second subset of pixels may be configured to the detection mode during the first temporal frame and to the floating mode during the second temporal frame.

The control unit 102 may comprise at least one processor. The at least one processor may comprise, for example, one or more of various processing devices, such as a co-processor, a microprocessor, a controller, a digital signal processor (DSP), a processing circuitry with or without an accompanying DSP, or various other processing devices including integrated circuits such as, for example, an application-specific integrated circuit (ASIC), a field-programmable gate array (FPGA), a microcontroller unit (MCU), a hardware accelerator, a special-purpose computer chip, or the like.

The control unit 102 may further comprise a memory. The memory may be configured to store, for example, computer programs and the like. The memory may comprise one or more volatile memory devices, one or more non-volatile memory devices, and/or a combination of one or more volatile memory devices and non-volatile memory devices. For example, the memory may be embodied as magnetic storage devices (such as hard disk drives, floppy disks, magnetic tapes, etc.), optical magnetic storage devices, and semiconductor memories (such as mask ROM, PROM (programmable ROM), EPROM (erasable PROM), flash ROM, RAM (random access memory), etc.).

As a person skilled in the art can appreciate, when the control unit 102 is configured to implement some functionality, some component and/or components of the control unit 102, such as the at least one processor and/or the memory, may be configured to implement this functionality. Furthermore, when the at least one processor is configured to implement some functionality, this functionality may be implemented using program code comprised, for example, in the memory.

Figure 2:
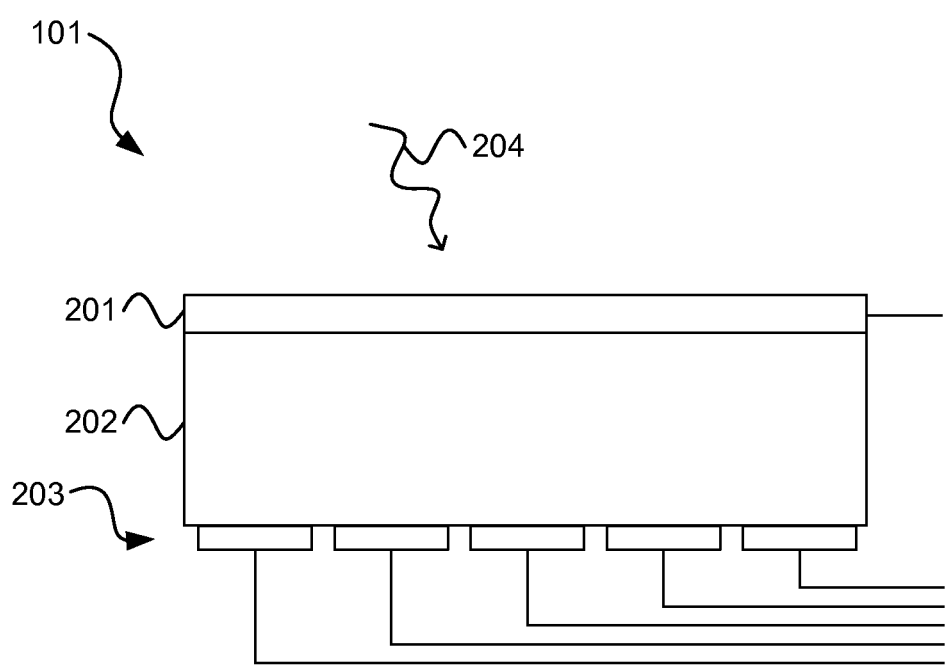
FIG. 2 illustrates a schematic representation of a detector according to an embodiment.

FIG. 2 illustrates a schematic representation of a detector 101 according to an embodiment.

According to an embodiment, the detector 101 comprises a conversion layer 202 configured to convert the incident x-ray and/or gamma ray radiation 204 into electric charge and a plurality of electrodes 203, corresponding to the plurality of pixels, configured to collect the electric charge when in the detection mode.

For example, in the embodiment of FIG. 2, the detector 101 comprises a top electrode 201, a conversion layer 202, and a plurality of electrodes 203. When a bias voltage is applied, by for example the control unit 102, between the top electrode 201 and an electrode in the plurality of electrodes 203, free electric charge generated by events caused by the incident radiation 204 in the conversion layer 204 drifts to the electrode. Thus, the amount of charge collected via an electrode in the plurality of electrodes 203 during, for example, a temporal frame is proportional to the number of events caused by the incident radiation 204 in the vicinity of the electrode. Thus, by collecting and measuring the charge over, for example, multiple temporal frames, spectral information and a spatial distribution, i.e. an image, of the incident radiation 204 can be obtained.

According to an embodiment, the conversion layer 202 comprises cadmium telluride and/or cadmium zinc telluride.

The detector 101 may comprise a direct conversion detector. Thus, the conversion layer 202 may directly convert the incident radiation 204 into electric charge to be collected by the plurality of electrodes 203.

The detector 101 may comprise, silicon, gallium arsenide (GaAs), or any other material capable of converting the incident radiation 204 into electric charge.

Figure 3:
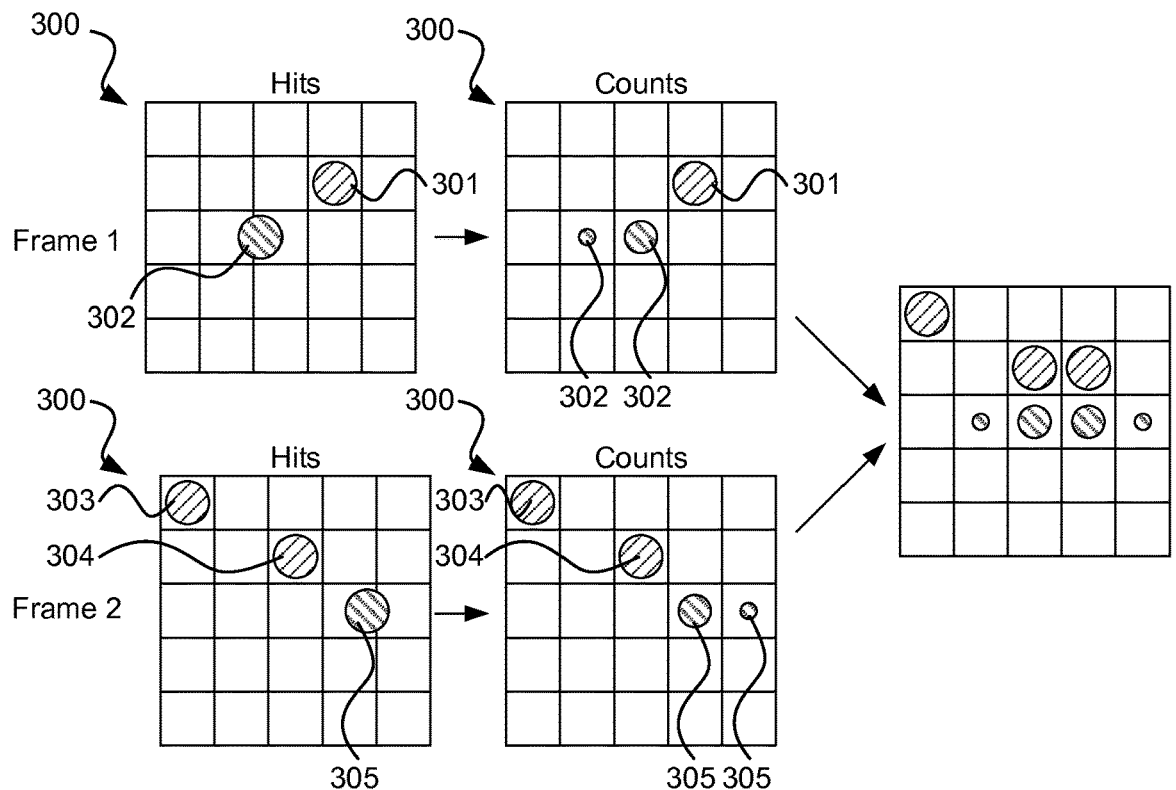
FIG. 3 illustrates a schematic representation of charge sharing between pixels of a detector according to a comparative example.

FIG. 3 illustrates charge sharing between pixels 300 of a detector according to a comparative example.

During a first temporal frame, a first hit 301 and a second hit 302 of radiation reach the detector. As can be seen from FIG. 3, the first hit 301 is substantially in the middle of a pixel, while the second hit 302 is between two pixels. Since the first hit 301 is in the middle of a pixel, substantially all of the charge/energy generated by the first hit 301 is collected via that pixel. On the other hand, since the second hit 302 is between two pixels, the generated charge/energy is collected via the two pixels as is illustrated in FIG. 3. This may be referred to as charge sharing. Charge sharing may cause noise to the measured energy spectra.

During a second temporal frame, a third 303, fourth 304, and fifth 305 hit occur. Similarly to the first hit 301, the third 303 and fourth hit 304 are substantially in the middle of a pixel and no charge sharing occurs. The fifth hit 305, on the other hand, is between pixels and charge sharing occurs as illustrated in FIG. 3.

In an ideal case, a hit caused by the incident radiation generates a charge cloud is fully collected via a single pixel. However, the detector may have no isolation between the pixels. Thus, in a real case, part of the generated cloud may be collected via neighbouring pixels if the hit occurs close to edge of or between pixels, such as in the case of the second 302 and the fifth hit 305. This may generate noise to lower energies and decrease the spectral resolution of the detector. When the hits from multiple frames are combined, such as in the example of FIG. 3, the noise is also combined into the final result.

It may be possible mitigate charge sharing effects using complicated hardware-based solutions that may require space from the ASIC and should be fit inside the pixel dimensions. Since the pixel dimension may be, for example, 0.1 mm×0.1 mm, this may be difficult to implement in practice.

Figure 4:
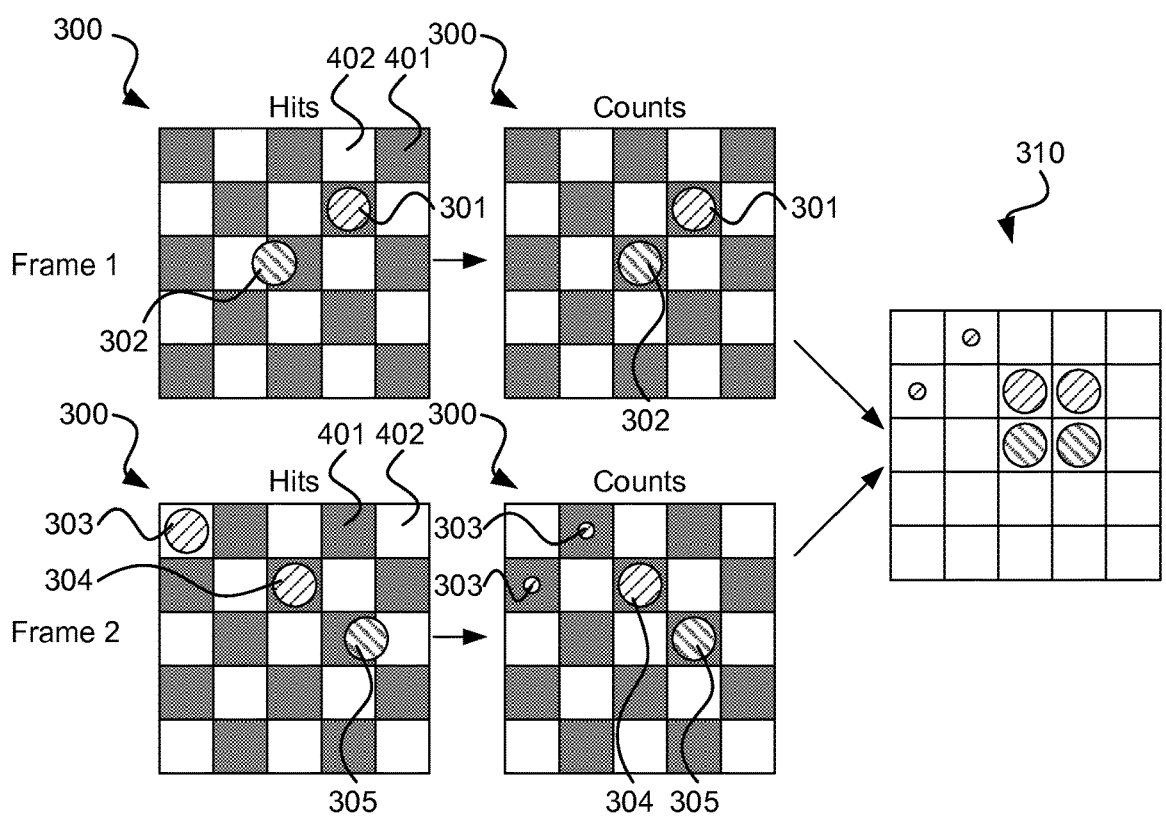
FIG. 4 illustrates a schematic representation of charge sharing mitigation according to an embodiment.

FIG. 4 illustrates charge sharing mitigation according to an embodiment.

In the embodiment of FIG. 4, similar hits occur as in the comparative example of FIG. 3. However, in the embodiment of FIG. 4, a first subset of pixels is in a floating mode 402 and a second subset of pixels is in a detection mode 401 during the first temporal frame. Thus, even though the second hit 302 again occurs between two pixels, the charge is collected by a single pixel, since only one of the two pixels is in the detection mode 401 during the first temporal frame and the other pixel is in the floating mode 402. The first hit 301 is detected similarly to the comparative example of FIG. 3, since the corresponding pixel is in the detection mode 401.

In the embodiment of FIG. 4, the subset of pixels that are configured to the detection mode 401 during the first temporal frame are configured to the floating mode 402 during the second temporal frame and vice versa.

During the second temporal frame, the third hit 303 occurs again substantially in the middle of a pixel. However, since the pixel in question is in the floating mode 402 during the hit, the generated charge is collected by two adjacent pixels that are in the detection mode 401. The fifth hit 305 is detected only by one pixel similarly to the second hit 302. The fourth hit 304 is detected also by a single pixel, since the fourth hit 304 again occurs in the middle of a pixel that is in the detection mode 401.

According to an embodiment, the first subset of pixels corresponds to the fourth subset of pixels and/or the second subset of pixels corresponds to the third subset of pixels. For example, in the embodiment of FIG. 4, this is the case. Thus, each pixel in the first subset of pixels is in the floating mode during the first temporal frame and in the detection mode during the second temporal frame, and each pixel in the second subset of pixels is in the detection mode during the first temporal frame and in the floating mode during the second temporal frame.

According to an embodiment, pixels in the first subset of pixels are spatially non-adjacent, pixels in the second subset of pixels are spatially non-adjacent, pixels in the third subset of pixels are spatially non-adjacent, and/or pixels in the fourth subset of pixels are spatially non-adjacent. For example, in the embodiment of FIG. 4, the first subset and the second subset of pixels are spatially non-adjacent, since there is always at least one pixel between any pair of pixels in the first subset or in the second subset. However, the pattern illustrated in the embodiment of FIG. 4 is only exemplary and the pixels may also be non-adjacent in any other manner.

According to an embodiment, the first subset of pixels, the second subset of pixels, the third subset of pixels, and/or the fourth subset of pixels forms a chessboard pattern. An example of a chessboard pattern is illustrated in the embodiment of FIG. 4.

According to an embodiment, the control unit 102 is further configured to, during the first temporal frame, obtain a detection count signal from each pixel in the second subset of pixels. The control unit 102 may be further configured to, during the second temporal frame, obtain a detection count signal from each pixel in the fourth subset of pixels. The detection count signal may comprise any signal that is, for example, proportional to the number of events occurring the vicinity of the corresponding pixel. For example, the detection count signal may comprise a current signal due to the electric charge generated in the conversion layer 202.

According to an embodiment, the control unit 102 is further configured to combine the detection count signals from the first temporal frame and the second temporal frame. This may produce a combined count distribution 310.

The counts from the first temporal frame and from the second temporal frame may be combined into a single count distribution as illustrated, for example, in the embodiments of FIG. 4. This way, counts can be obtained for all pixels in the plurality of pixels 300, since pixels that were in the floating mode during the first temporal frame were in the detection more during the second temporal frame and vice versa. In some embodiments, the control unit 102 may performing this for more than two temporal frames.

The device 100 can reduce charge sharing to neighbouring pixels when hits occur close to pixel edges without complicate hardware-level correction algorithms. Mishits that occur due to a hit in the middle of a floating pixel can be collected significantly lower energies and may not impact the energy resolution in the energy range of interest. Thus, the ASIC design may be simplified.

Since pixels can be configured into the floating mode independently, different type of imaging modalities can be generated. The patterns of the pixels in the floating 402 and detection mode 401 illustrated in the embodiments herein are only exemplary. The patterns can be configured based on user and application requirements.

In some embodiments, more than two temporal frames can also be used, and the plurality of pixels may be divided into more than two subsets for each temporal frame.

In some embodiments, the floating of pixels can be combined with a hardware-level charge sharing corrections. For example, if a hit occurs in the middle of a floating pixel, such as the third hit 303 in the embodiment of FIG. 4, the mishit occurring in the neighbouring pixels can be detected by identifying when a hit occurs during the same temporal frame in, for example, all of the neighbouring pixels. The charge can then be counted for the floating pixel.

According to an embodiment, the control unit 102 is further configured to, during the first temporal frame and/or the second temporal frame, identify a detection in each of at least two pixels in the detection mode, wherein the at least two pixels are adjacent two a pixel in the floating mode, and count the detections from the at least two pixels for the floating pixel. For example, in the embodiments of FIG. 4, the control unit 102 may identify the detections in the two adjacent pixels due to the third hit 303 and count the detections for the floating pixel at which the third hit 303 actually occurred. Similarly, if the floating pixel is at the edge of the plurality of pixels 300 but not in the corner like the third hit 303 is, the control unit 102 may use three adjacent pixels. If the floating pixel is not in the corned and not at the edge of the plurality of pixels 300, the control unit 102 may use four adjacent pixels. If the pattern of the floating pixels and/or of the detection pixels is different, the number of pixels used may be different.

Figure 5:
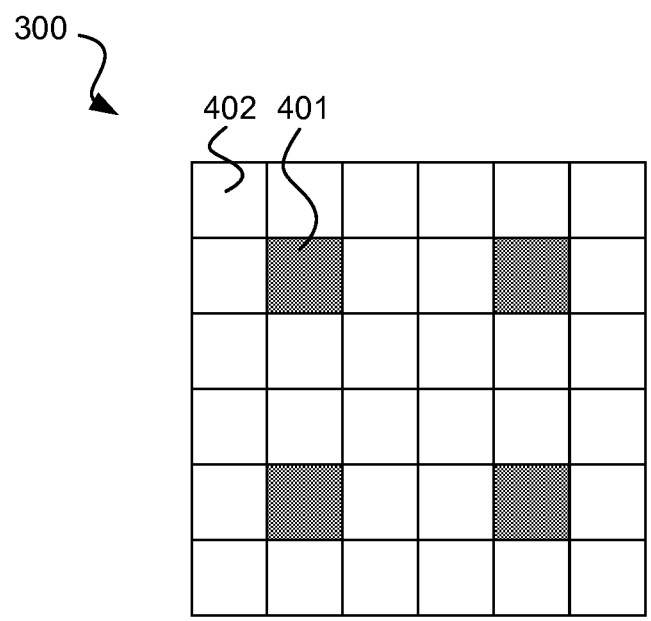
FIG. 5 illustrates a schematic representation of a plurality of pixels according to an embodiment.

FIG. 5 illustrates a schematic representation of a plurality of pixels 300 according to an embodiment.

In the embodiment of FIG. 5, one pixel out of a group of nine pixels is in the detection mode 401 while the eight other pixels in the group are in floating mode 402. The plurality of pixels 300 may comprise a plurality of such groups on nine pixels. This may be the situation during a single frame, such as the first temporal frame. During each subsequent frame, a different pixel out of the group of nine pixels may be in the detection mode 401 until all of the nine pixels have been in the detection mode 401. The procedure may then be repeated.

Alternatively, the same pixel out of the nine pixels may be in the detection mode 401 for every frame. This way, the spectral resolution of the device 100 can be increased by reducing charge sharing while the temporal resolution may decrease. Thus, the trade-off between temporal and spectral resolution can be adjusted based on the requirements of the imaging application.

In any embodiment disclosed herein, the same subset of pixels may be in the detection mode 401 for the first temporal frame and for the second temporal frame. In such embodiments, the first subset of pixels corresponds to the third subset of pixels and the second subset of pixels corresponds to the fourth subset of pixels. This may be referred to as static floating, since the floating pixels do not change between the temporal frames.

Figure 6:
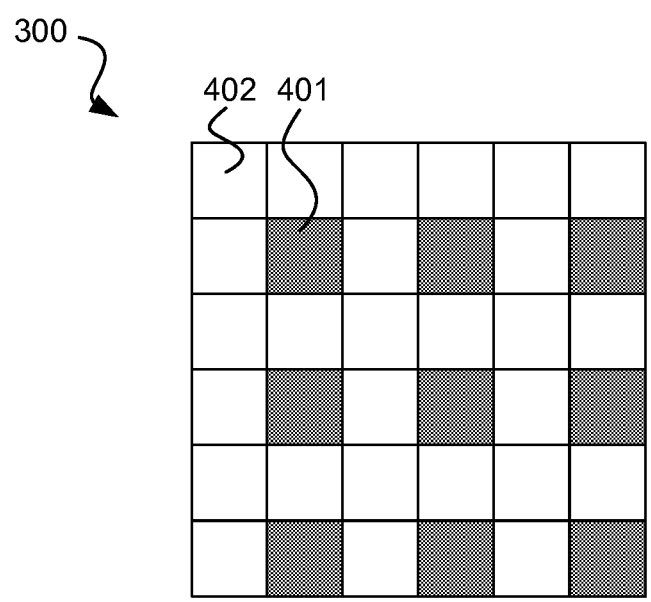
FIG. 6 illustrates a schematic representation of a plurality of pixels according to another embodiment.

FIG. 6 illustrates a schematic representation of a plurality of pixels 300 according to an embodiment.

In the embodiment of FIG. 6, one pixel out of a group of four pixels is in the detection mode 401 while the three other pixels in the group are in floating mode 402. The plurality of pixels 300 may comprise a plurality of such groups. This may be the situation during a single frame, such as the first temporal frame. During each subsequent frame, a different pixel out of the group of four pixels may be in the detection mode 401 until all of the four pixels have been in the detection mode 401. The procedure may then be repeated.

Alternatively, the same pixel out of the four pixels may be in the detection mode 401 for every frame.

Similarly to the embodiments disclosed above, the plurality of pixels 300 may comprise groups of pixels, wherein each group comprises N pixels. For example, in the embodiments of FIG. 4, FIG. 5, and FIG. 6, N=2, N=9, and N=4, respectively. The control unit 102 may be configured to configure a pixel in each group to detection mode 401 and configure the rest of the pixels to floating mode 402. For every subsequent temporal frame, the control unit 102 may configure a different pixel in each group to the detection mode 401. The control unit 102 may continue this for N temporal frames, i.e. until each pixel in a group has been in the detection mode 401. The control unit 102 may then start the procedure again.

Figure 7:
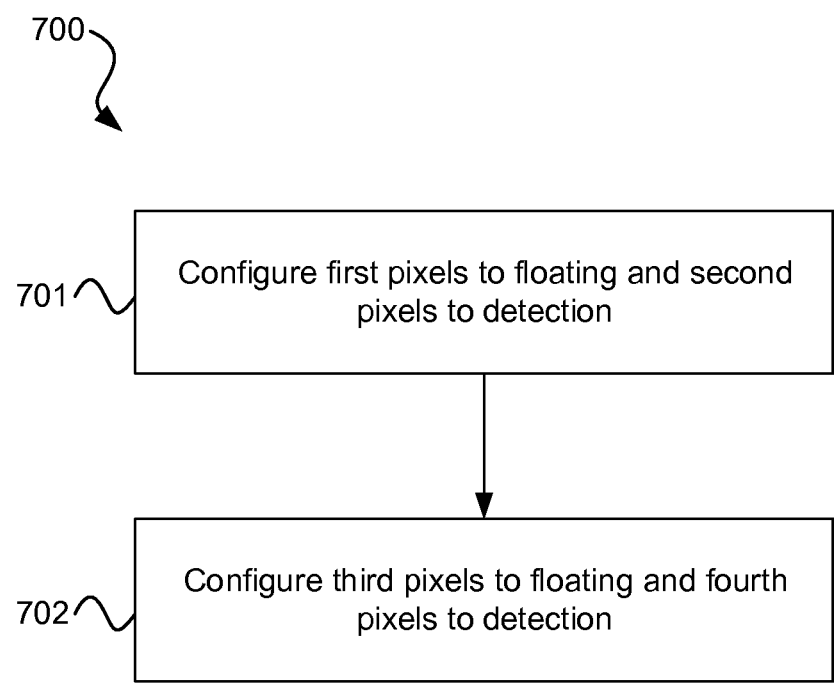
FIG. 7 illustrates a flow chart representation of a method according to an embodiment.

FIG. 7 illustrates a flow chart representation of a method 700 according to an embodiment.

A method 700 for controlling a detector comprising a plurality of pixels, each pixel in the plurality of pixels being switchable between a floating mode and a detection mode, wherein each pixel in the plurality of pixels is configured to detect incident x-ray or gamma ray radiation when in the detection mode, comprises, during a first temporal frame, configuring 701 a first subset of pixels in the plurality of pixels to the floating mode and a second subset of pixels in the plurality of pixels to the detection mode.

The method 700 may further comprise, during a second temporal frame, configuring 702 a third subset of pixels in the plurality of pixels to the floating mode and a fourth subset of pixels in the plurality of pixels to the detection mode.

The method 700 may be performed by, for example, the control unit 102.

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A device, comprising:
a detector comprising a plurality of pixels, each pixel in the plurality of pixels being switchable between a floating mode and a detection mode, wherein each pixel in the plurality of pixels is configured to detect incident x-ray and/or gamma ray radiation when in the detection mode;
a control unit coupled to the detector, configured to:
during a first temporal frame, configure a first subset of pixels in the plurality of pixels to the floating mode and a second subset of pixels in the plurality of pixels to the detection mode; and
during a second temporal frame, configure a third subset of pixels in the plurality of pixels to the floating mode and a fourth subset of pixels in the plurality of pixels to the detection mode.

2. The device according to claim 1, wherein the first subset of pixels corresponds to the fourth subset of pixels and/or the second subset of pixels corresponds to the third subset of pixels.

3. The device according to claim 1, wherein pixels in the first subset of pixels are spatially non-adjacent, pixels in the second subset of pixels are spatially non-adjacent, pixels in the third subset of pixels are spatially non-adjacent, and/or pixels in the fourth subset of pixels are spatially non-adjacent.

4. The device according to claim 1, wherein the first subset of pixels, the second subset of pixels, the third subset of pixels, and/or the fourth subset of pixels forms a chessboard pattern.

5. The device according to claim 1, wherein the control unit is further configured to:
during the first temporal frame, obtain a detection count signal from each pixel in the second subset of pixels; and
during the second temporal frame, obtain a detection count signal from each pixel in the fourth subset of pixels.

6. The device according to claim 5, wherein the control unit is further configured to:
combine the detection count signals from the first temporal frame and the second temporal frame.

7. The device according to claim 1, wherein the control unit is further configured to:
during the first temporal frame and/or the second temporal frame, identify a detection in each of at least two pixels in the detection mode, wherein the at least two pixels are adjacent two a pixel in the floating mode; and
count the detections from the at least two pixels for the floating pixel.

8. The device according to claim 1, wherein the detector comprises a conversion layer configured to convert the incident x-ray or gamma ray radiation into electric charge and a plurality of electrodes, corresponding to the plurality of pixels, configured to collect the electric charge when in the detection mode.

9. The device according to claim 8, wherein the conversion layer comprises cadmium telluride and/or cadmium zinc telluride.

10. The device according to claim 8, wherein the conversion layer is non-pixelated.

11. A method for controlling a detector comprising a plurality of pixels, each pixel in the plurality of pixels being switchable between a floating mode and a detection mode, wherein each pixel in the plurality of pixels is configured to detect incident x-ray or gamma ray radiation when in the detection mode, the method comprising:
during a first temporal frame, configuring a first subset of pixels in the plurality of pixels to the floating mode and a second subset of pixels in the plurality of pixels to the detection mode; and
during a second temporal frame, configuring a third subset of pixels in the plurality of pixels to the floating mode and a fourth subset of pixels in the plurality of pixels to the detection mode.

12. The method according to claim 11, wherein the first subset of pixels corresponds to the fourth subset of pixels and/or the second subset of pixels corresponds to the third subset of pixels.

13. The method according to claim 11, wherein pixels in the first subset of pixels are spatially non-adjacent, pixels in the second subset of pixels are spatially non-adjacent, pixels in the third subset of pixels are spatially non-adjacent, and/or pixels in the fourth subset of pixels are spatially non-adjacent.

14. A computer program product comprising program code configured to perform the method according to claim 11 when the computer program product is executed on a computer.

* * * * *